C. GABEL.
DUST PAN.
APPLICATION FILED JAN. 3, 1908.

914,484.

Patented Mar. 9, 1909.

Witnesses
G. M. Spring
A. B. Clarke

Inventor
Charles Gabel,
By David P. Moore,
his Attorney

UNITED STATES PATENT OFFICE.

CHARLES GABEL, OF HAWKEYE, IOWA.

DUST-PAN.

No. 914,484.  Specification of Letters Patent.  Patented March 9, 1909.

Application filed January 3, 1908. Serial No. 409,220.

*To all whom it may concern:*

Be it known that I, CHARLES GABEL, a citizen of the United States, residing at Hawkeye, in the county of Fayette and State of Iowa, have invented certain new and useful Improvements in Dust-Pans, of which the following is a specification.

This invention relates to dust pans, and more particularly to that class having a lid for closing the same.

The object of this invention is to provide a dust pan having a lid with means for automatically closing such lid when the pan is raised from the floor; also to close the lid and support the pan in such a manner that the dust cannot escape therefrom.

With these and such other objects as might hereinafter appear, my invention consists in the particular construction of the various parts, and in the novel manner of combination and arrangement of said parts, all of which will be hereinafter more fully described and specifically pointed out in the appended claims.

Figure 1:
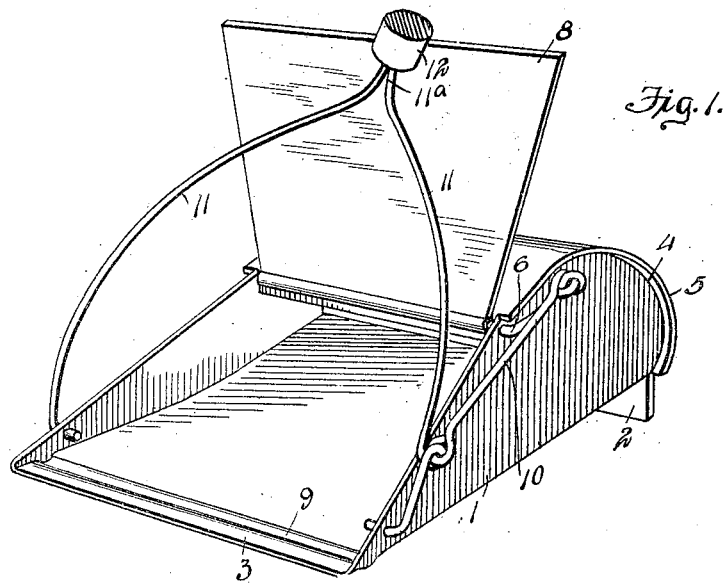
Figure 2:
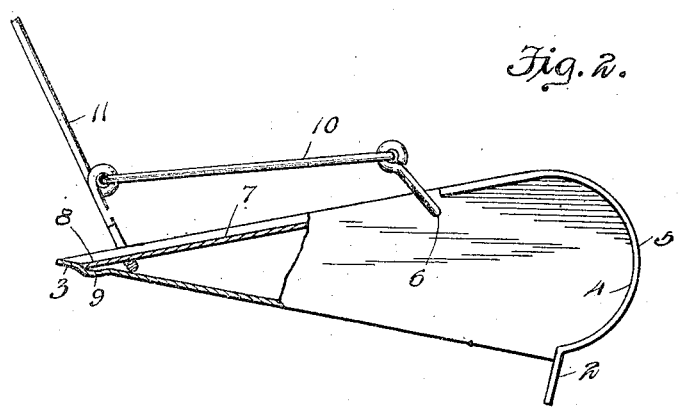

Figure 1 is a perspective view of the pan in an open position; Fig. 2 is a side elevation.

Referring by numerals to the drawings, 1 represents the pan which may be of any shape or material found most desirable. The pan illustrated in the drawing is provided with a foot piece or rest 2, so as to bring the lip 3, flush against the floor. The side walls of the pan are curved as shown at 4, and such curved portion supports the back 5, which is extended over the top of the pan to the transverse rod 6. This rod supports the cover or lid 7, the free end 8 of which engages, when the lid is closed, the portion 9, approximately near the lip of the pan. The rod 6 has one end bent at right angles to its main portion and provided with an eye, or other means for pivotally connecting the rod 10, which is likewise pivotally connected to a yoke handle 11 pivoted in the walls of the pan and provided with an elongated lug 11ª, adapted to receive the handle proper 12. It will thus be seen that when the pan is placed upon the floor and the handle thrown back the lid, owing to the pivotal connection between the handle and the same will be open, and that as the pan is raised from the floor, it will be closed.

The operation of this pan is similar to the form first described,

I desire to distinctly state and emphasize the fact that although I have shown certain component and coöperative parts, which I deem sufficient to carry out the fundamental principles of my invention, I do not limit myself to exact details, as shown and described, since various minor changes may be resorted to without sacrificing any of the principles or advantages of this invention.

Having thus described the various features of my invention, what I claim as new and desire to secure by Letters Patent is:

1. In a dust pan, a transverse rod, a lid mounted upon said rod, a handle, a pivotal connection between the handle and the transverse rod, substantially as specified.

2. In a dust pan, in combination with the pan, a transverse rod journaled in the wall thereof, a lid secured to said rod, a yoke handle mounted in the wall of the pan, and a rod connecting said transverse rod and handle, substantially as specified.

3. In a dust pan, in combination with the pan, a transverse rod mounted in the wall of the pan, a lid secured to said rod, one end of the rod being bent at right angles to the main body thereof, a yoke handle mounted in the walls of the pan, and a rod pivotally connecting said handle to the angular portion of the transverse rod, substantially as specified.

4. In a dust pan, in combination with the pan, a transverse rod mounted in the walls of the pan, a lid secured to said rod, said rod having a crank arm, a yoke handle mounted in the wall of the pan approximately rear the lip thereof, a rod pivotally connecting the crank arm and handle, substantially as specified.

5. In a dust pan, a transverse rod, a lid mounted upon said rod, a handle mounted in the pan near the lip thereof, and a pivotal connection between the handle and the transverse rod, as and for the purpose set forth.

CHARLES GABEL.

Witnesses:
HENRY P. BELSCHNER,
CHR. G. DAUDEL.